United States Patent
Horan et al.

(10) Patent No.: US 12,130,704 B2
(45) Date of Patent: *Oct. 29, 2024

(54) ENCODING AND ENCRYPTING DATA IN A STORAGE NETWORK

(71) Applicant: Pure Storage, Inc., Santa Clara, CA (US)

(72) Inventors: Scott M. Horan, Clarendon Hills, IL (US); Wesley B. Leggette, Chicago, IL (US); Jason K. Resch, Warwick, RI (US)

(73) Assignee: Pure Storage, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/479,236

(22) Filed: Oct. 2, 2023

(65) Prior Publication Data

US 2024/0028455 A1 Jan. 25, 2024

Related U.S. Application Data

(63) Continuation of application No. 17/449,189, filed on Sep. 28, 2021, now Pat. No. 11,782,789, which is a (Continued)

(51) Int. Cl.
*H03M 13/27* (2006.01)
*G06F 3/06* (2006.01)
(Continued)

(52) U.S. Cl.
CPC .......... *G06F 11/108* (2013.01); *G06F 3/0604* (2013.01); *G06F 3/0605* (2013.01);
(Continued)

(58) Field of Classification Search
CPC ............... G06F 11/108; G06F 11/1076; G06F 11/1662; G06F 11/3034; G06F 13/4282;
(Continued)

(56) References Cited

U.S. PATENT DOCUMENTS 4,092,732 A 5/1978 Ouchi
5,454,101 A 9/1995 Mackay
(Continued)

OTHER PUBLICATIONS

Chung; An Automatic Data Segmentation Method for 3D Measured Data Points; National Taiwan University; pp. 1-8; 1998.
(Continued)

*Primary Examiner* — Guy J Lamarre
(74) *Attorney, Agent, or Firm* — Garlick & Markison; Bruce E. Stuckman

(57) ABSTRACT

A storage network operates by: receiving a encoded data slice for storage by the storage network, wherein the encoded data slice is associated with a vault; generating a encryption key corresponding to the encoded data slice based on a vault identifier associated with the vault; utilizing the encryption key to generate a encrypted data slice and that corresponds to, and is based on, the encoded data slice; storing the encrypted data slice in a storage unit of the storage network; receiving a request to retrieve the encoded data slice; retrieving the encrypted data slice corresponding to the encoded data slice from the storage unit of the storage network; generating a decryption key corresponding to the encoded data slice based on the vault identifier, wherein the decryption key is different from the encryption key; and regenerating the encoded data slice using the decryption key.

20 Claims, 4 Drawing Sheets

Related U.S. Application Data continuation-in-part of application No. 16/555,035, filed on Aug. 29, 2019, now Pat. No. 11,157,366, which is a continuation of application No. 15/144,080, filed on May 2, 2016, now Pat. No. 10,467,096.

(60) Provisional application No. 62/199,816, filed on Jul. 31, 2015.

(51) Int. Cl.

| | | |
|---|---|---|
| *G06F 11/10* | (2006.01) | |
| *G06F 11/16* | (2006.01) | |
| *G06F 11/30* | (2006.01) | |
| *G06F 13/42* | (2006.01) | |
| *G06F 16/11* | (2019.01) | |
| *G06F 16/182* | (2019.01) | |
| *G06F 16/2457* | (2019.01) | |
| *G06F 21/62* | (2013.01) | |
| *G06F 21/64* | (2013.01) | |
| *H03M 13/15* | (2006.01) | |
| *H03M 13/25* | (2006.01) | |
| *H03M 13/29* | (2006.01) | |
| *H03M 13/37* | (2006.01) | |
| *H04L 1/00* | (2006.01) | |
| *H04L 9/08* | (2006.01) | |
| *H04L 27/34* | (2006.01) | |
| *H04L 67/1097* | (2022.01) | |
| *H04L 67/63* | (2022.01) | |

(52) U.S. Cl.
CPC ............ *G06F 3/061* (2013.01); *G06F 3/0619* (2013.01); *G06F 3/0622* (2013.01); *G06F 3/0643* (2013.01); *G06F 3/0644* (2013.01); *G06F 3/0647* (2013.01); *G06F 3/065* (2013.01); *G06F 3/0653* (2013.01); *G06F 3/0668* (2013.01); *G06F 3/067* (2013.01); *G06F 3/0689* (2013.01); *G06F 11/1076* (2013.01); *G06F 11/1662* (2013.01); *G06F 11/3034* (2013.01); *G06F 13/4282* (2013.01); *G06F 16/122* (2019.01); *G06F 16/1824* (2019.01); *G06F 16/24578* (2019.01); *G06F 21/6218* (2013.01); *G06F 21/645* (2013.01); *H03M 13/2906* (2013.01); *H03M 13/3761* (2013.01); *H04L 9/0861* (2013.01); *H04L 67/1097* (2013.01); *H04L 67/63* (2022.05); *G06F 3/064* (2013.01); *G06F 2201/805* (2013.01); *H03M 13/1515* (2013.01)

(58) Field of Classification Search
CPC .. G06F 21/6218; G06F 21/645; G06F 3/0604; G06F 3/0605; G06F 3/061; G06F 3/0619; G06F 3/0622; G06F 3/0643; G06F 3/0644; G06F 3/0647; G06F 3/065; G06F 3/0653; G06F 3/0668; G06F 3/067; H03M 13/2906; H03M 13/3761; H04L 63/061; H04L 63/0853; H04L 63/108; H04L 67/1097; H04L 67/327; H04L 9/0861
See application file for complete search history.

(56) References Cited

U.S. PATENT DOCUMENTS

| | | |
|---|---|---|
| 5,485,474 A | 1/1996 | Rabin |
| 5,774,643 A | 6/1998 | Lubbers |
| 5,802,364 A | 9/1998 | Senator |
| 5,809,285 A | 9/1998 | Hilland |
| 5,890,156 A | 3/1999 | Rekieta |
| 5,987,622 A | 11/1999 | Lo Verso |
| 5,991,414 A | 11/1999 | Garay |
| 6,012,159 A | 1/2000 | Fischer |
| 6,058,454 A | 5/2000 | Gerlach |
| 6,128,277 A | 10/2000 | Bruck |
| 6,175,571 B1 | 1/2001 | Haddock |
| 6,192,472 B1 | 2/2001 | Garay |
| 6,256,688 B1 | 7/2001 | Suetaka |
| 6,272,658 B1 | 8/2001 | Steele |
| 6,301,604 B1 | 10/2001 | Nojima |
| 6,356,949 B1 | 3/2002 | Katsandres |
| 6,366,995 B1 | 4/2002 | Nikolaevich |
| 6,374,336 B1 | 4/2002 | Peters |
| 6,415,373 B1 | 7/2002 | Peters |
| 6,418,539 B1 | 7/2002 | Walker |
| 6,449,688 B1 | 9/2002 | Peters |
| 6,567,948 B2 | 5/2003 | Steele |
| 6,571,282 B1 | 5/2003 | Bowman-Amuah |
| 6,609,223 B1 | 8/2003 | Wolfgang |
| 6,718,361 B1 | 4/2004 | Basani |
| 6,760,808 B2 | 7/2004 | Peters |
| 6,785,768 B2 | 8/2004 | Peters |
| 6,785,783 B2 | 8/2004 | Buckland |
| 6,826,711 B2 | 11/2004 | Moulton |
| 6,879,596 B1 | 4/2005 | Dooply |
| 7,003,688 B1 | 2/2006 | Pittelkow |
| 7,024,451 B2 | 4/2006 | Jorgenson |
| 7,024,609 B2 | 4/2006 | Wolfgang |
| 7,080,101 B1 | 7/2006 | Watson |
| 7,103,824 B2 | 9/2006 | Halford |
| 7,103,915 B2 | 9/2006 | Redlich |
| 7,111,115 B2 | 9/2006 | Peters |
| 7,140,044 B2 | 11/2006 | Redlich |
| 7,146,644 B2 | 12/2006 | Redlich |
| 7,171,493 B2 | 1/2007 | Shu |
| 7,222,133 B1 | 5/2007 | Raipurkar |
| 7,240,236 B2 | 7/2007 | Cutts |
| 7,272,613 B2 | 9/2007 | Sim |
| 7,636,724 B2 | 12/2009 | De La Torre |
| 9,773,118 B1 | 9/2017 | Bennett |
| 10,248,506 B2 | 4/2019 | Horan |
| 10,467,096 B2 * | 11/2019 | Resch ............... G06F 11/3034 |
| 2002/0062422 A1 | 5/2002 | Butterworth |
| 2002/0166079 A1 | 11/2002 | Ulrich |
| 2003/0018927 A1 | 1/2003 | Gadir |
| 2003/0037261 A1 | 2/2003 | Meffert |
| 2003/0065617 A1 | 4/2003 | Watkins |
| 2003/0084020 A1 | 5/2003 | Shu |
| 2004/0024963 A1 | 2/2004 | Talagala |
| 2004/0122917 A1 | 6/2004 | Menon |
| 2004/0215998 A1 | 10/2004 | Buxton |
| 2004/0228493 A1 | 11/2004 | Ma |
| 2005/0100022 A1 | 5/2005 | Ramprashad |
| 2005/0114594 A1 | 5/2005 | Corbett |
| 2005/0125593 A1 | 6/2005 | Karpoff |
| 2005/0131993 A1 | 6/2005 | Fatula, Jr. |
| 2005/0132070 A1 | 6/2005 | Redlich |
| 2005/0144382 A1 | 6/2005 | Schmisseur |
| 2005/0229069 A1 | 10/2005 | Hassner |
| 2006/0047907 A1 | 3/2006 | Shiga |
| 2006/0136448 A1 | 6/2006 | Cialini |
| 2006/0156059 A1 | 7/2006 | Kitamura |
| 2006/0224603 A1 | 10/2006 | Correll, Jr. |
| 2007/0079081 A1 | 4/2007 | Gladwin |
| 2007/0079082 A1 | 4/2007 | Gladwin |
| 2007/0079083 A1 | 4/2007 | Gladwin |
| 2007/0088970 A1 | 4/2007 | Buxton |
| 2007/0174192 A1 | 7/2007 | Gladwin |
| 2007/0214285 A1 | 9/2007 | Au |
| 2007/0234110 A1 | 10/2007 | Soran |
| 2007/0283167 A1 | 12/2007 | Venters, III |
| 2008/0228821 A1 | 9/2008 | Mick |
| 2009/0094251 A1 | 4/2009 | Gladwin |
| 2009/0094318 A1 | 4/2009 | Gladwin |
| 2010/0023524 A1 | 1/2010 | Gladwin |
| 2011/0106904 A1 | 5/2011 | Resch |
| 2012/0311345 A1 | 12/2012 | Dhuse |
| 2014/0115387 A1 | 4/2014 | Vas |
| 2014/0122969 A1 | 5/2014 | Cilfone |

(56) References Cited

U.S. PATENT DOCUMENTS

| | | |
|---|---|---|
| 2014/0208154 A1 | 7/2014 | Gladwin |
| 2014/0222827 A1 | 8/2014 | Leggette |
| 2014/0317224 A1 | 10/2014 | Resch |
| 2015/0293817 A1 | 10/2015 | Subramanian |
| 2016/0231928 A1 | 8/2016 | Lewis |
| 2016/0352511 A1 | 12/2016 | Bashyam |
| 2017/0048021 A1 | 2/2017 | Yanovsky |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

Zeilenga; Lightweight Directory Access Protocol (LDAP): Technical Specification Road Map; IETF Network Working Group; RFC 4510; Jun. 2006; pp. 1-8.

\* cited by examiner distributed computing system 10

ENCODING AND ENCRYPTING DATA IN A STORAGE NETWORK

CROSS REFERENCE TO RELATED PATENTS

The present U.S. Utility Patent application claims priority pursuant to 35 U.S.C. § 120 as a continuation of U.S. Utility application Ser. No. 17/449,189, entitled "Encoding Data and Associated Metadata in a Storage Network", filed Sep. 28, 2021, which is a continuation-in-part of U.S. Utility application Ser. No. 16/555,035, entitled "Securing Data In A Dispersed Storage Network", filed Aug. 29, 2019, issued as U.S. Pat. No. 11,157,366 on Oct. 26, 2021, which is a continuation of U.S. Utility application Ser. No. 15/144,080, entitled "Securely Storing Data In A Dispersed Storage Network", filed May 2, 2016, issued as U.S. Pat. No. 10,467,096 on Nov. 5, 2019, which claims priority pursuant to 35 U.S.C. § 119(e) to U.S. Provisional Application No. 62/199,816, entitled "Storing Data And Associated Metadata In A Dispersed Storage Network", filed Jul. 31, 2015, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

Aspects of this invention relate generally to computer networks and more particularly to dispersed storage of data and distributed task processing of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

DETAILED DESCRIPTION OF THE INVENTION

Figure 1:
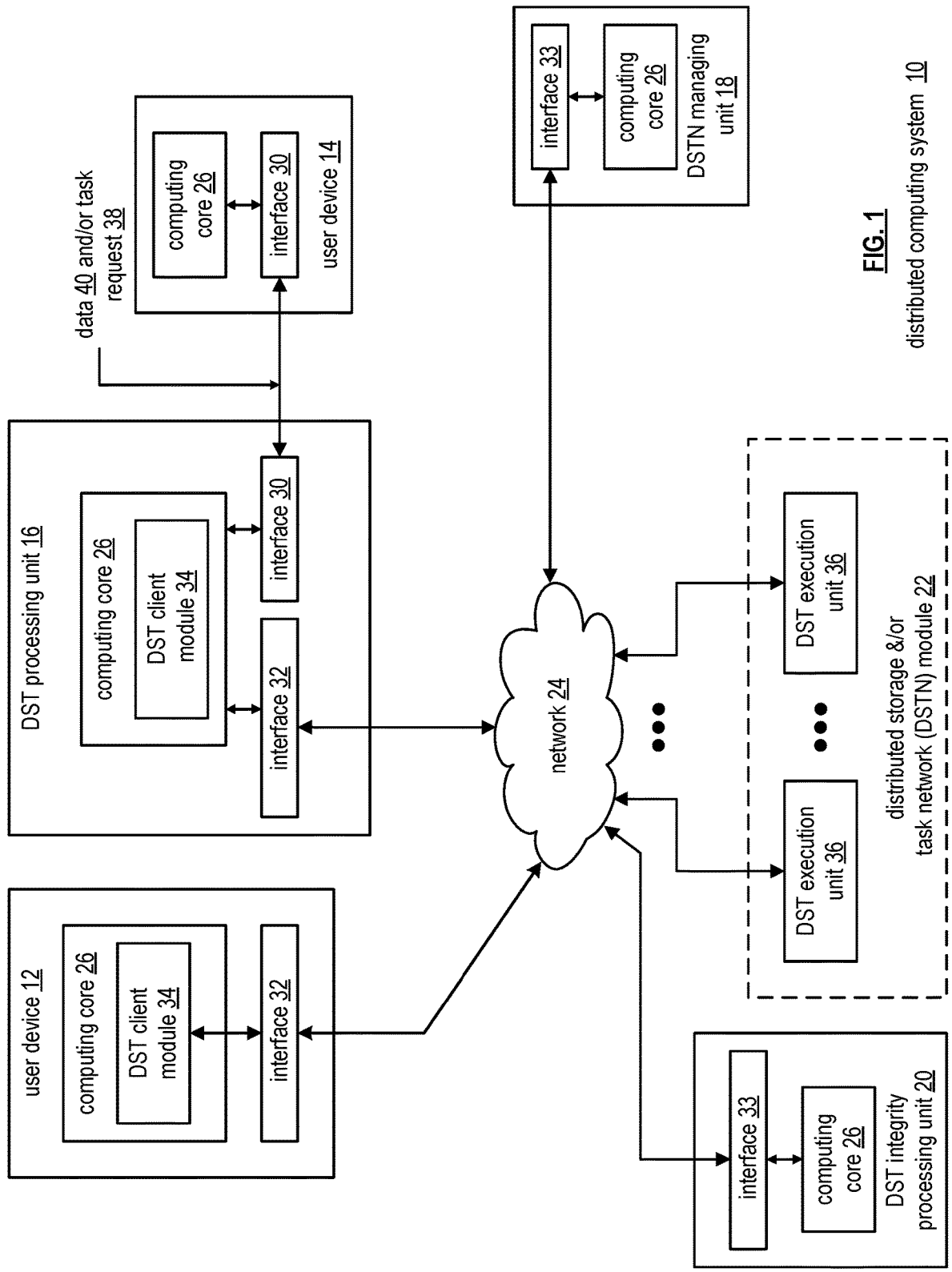
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more non-public intranet systems and/or public internet systems; and/or one or more local area networks (LAN) and/or wide area networks (WAN). Hereafter, the distributed computing system 10 may be interchangeably referred to as a dispersed storage network (DSN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, the DST execution unit may be interchangeably referred to as a storage unit and a set of DST execution units may be interchangeably referred to as a set of storage units.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval, and data storage integrity verification. In accordance with these three primary functions, data can be encoded (e.g., utilizing an information dispersal algorithm (IDA), utilizing a dispersed storage error encoding process), distributedly stored in physically different locations, and subsequently retrieved in a reliable and secure manner. Hereafter, distributedly stored may be interchangeably referred to as dispersed stored. Such a system is tolerant of a significant number of failures (e.g., up to a failure level, which may be greater than or equal to a pillar width (e.g., an IDA width of the IDA) minus a decode threshold minus one) that may result from individual storage device (e.g., DST execution unit 36) failures and/or network equipment failures without loss of data and without the need for a redundant or backup copy. Further, the distributed computing system 10 allows the data to be stored for an indefinite period of time without data loss and does so in a secure manner (e.g., the system is very resistant to unauthorized attempts at accessing the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (i SCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block associated with a portion of an overall namespace of the DSN) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated system registry information in one or more of the DSTN module 22, the user device 12, the DST processing unit 16, and the DST integrity processing unit 20.

The DS error encoding parameters (e.g., or dispersed storage error coding parameters for encoding and decoding) include data segmenting information (e.g., how many segments data (e.g., a file, a group of files, a data block, etc.) is divided into), segment security information (e.g., per segment encryption, compression, integrity checksum, etc.), error coding information (e.g., pillar/IDA width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a non-public vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

Each slice name is unique to a corresponding encoded data slice and includes multiple fields associated with the overall namespace of the DSN. For example, the fields may include a pillar number/pillar index, a vault identifier, an object number uniquely associated with a particular file for storage, and a data segment identifier of a plurality of data segments, where the particular file is divided into the plurality of data segments. For example, each slice name of a set of slice names corresponding to a set of encoded data slices that has been dispersed storage error encoded from a common data segment varies only by entries of the pillar number field as each share a common vault identifier, a common object number, and a common data segment identifier.

To support distributed task processing on received data, the distributed computing system 10 has two primary operations: DST (distributed storage and/or task processing) management and DST execution on received data. With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. With respect to the DST management, it is substantially similar to the DST management to support distributed task processing on received data.

Figure 2:
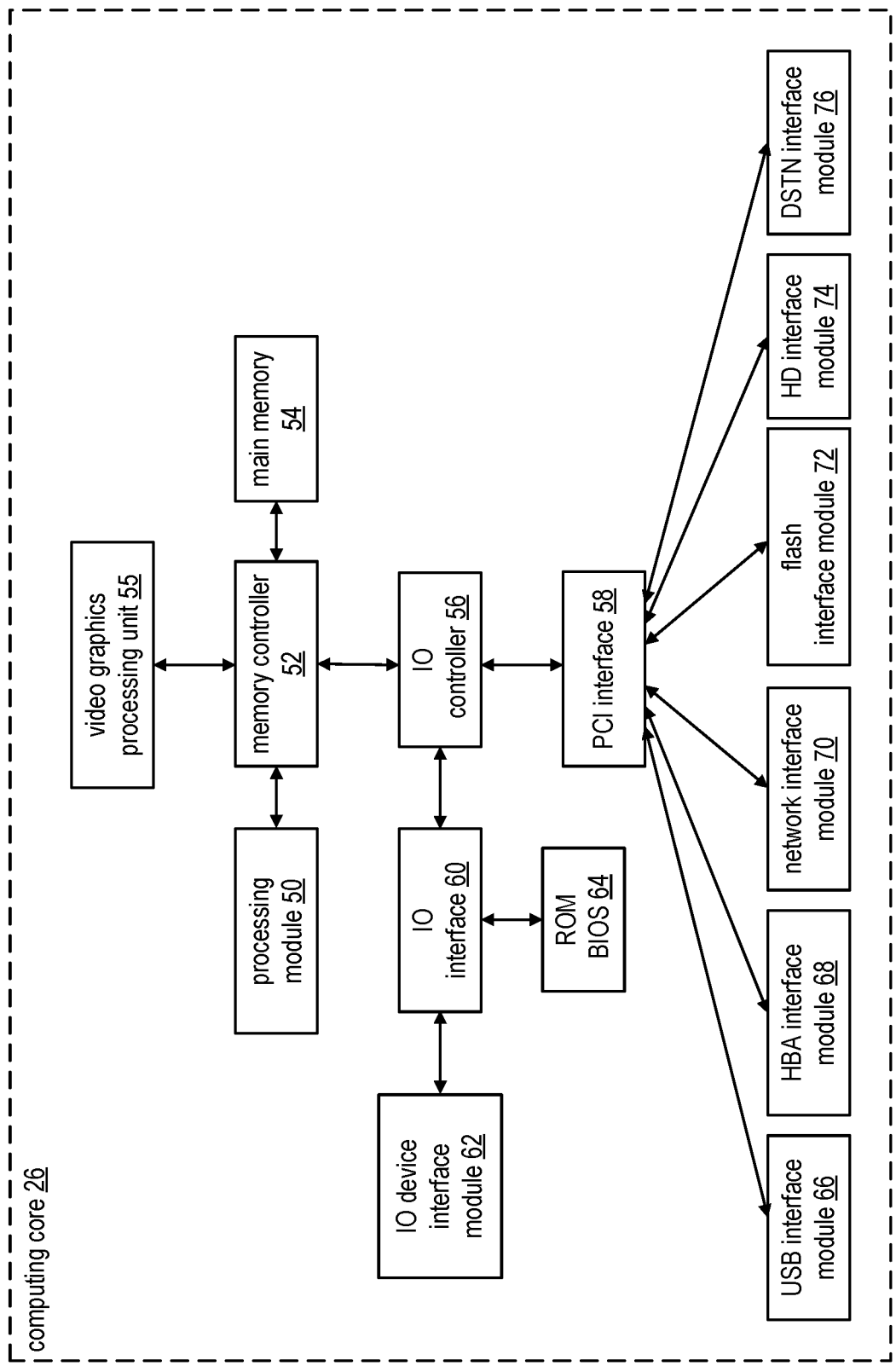
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (TO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
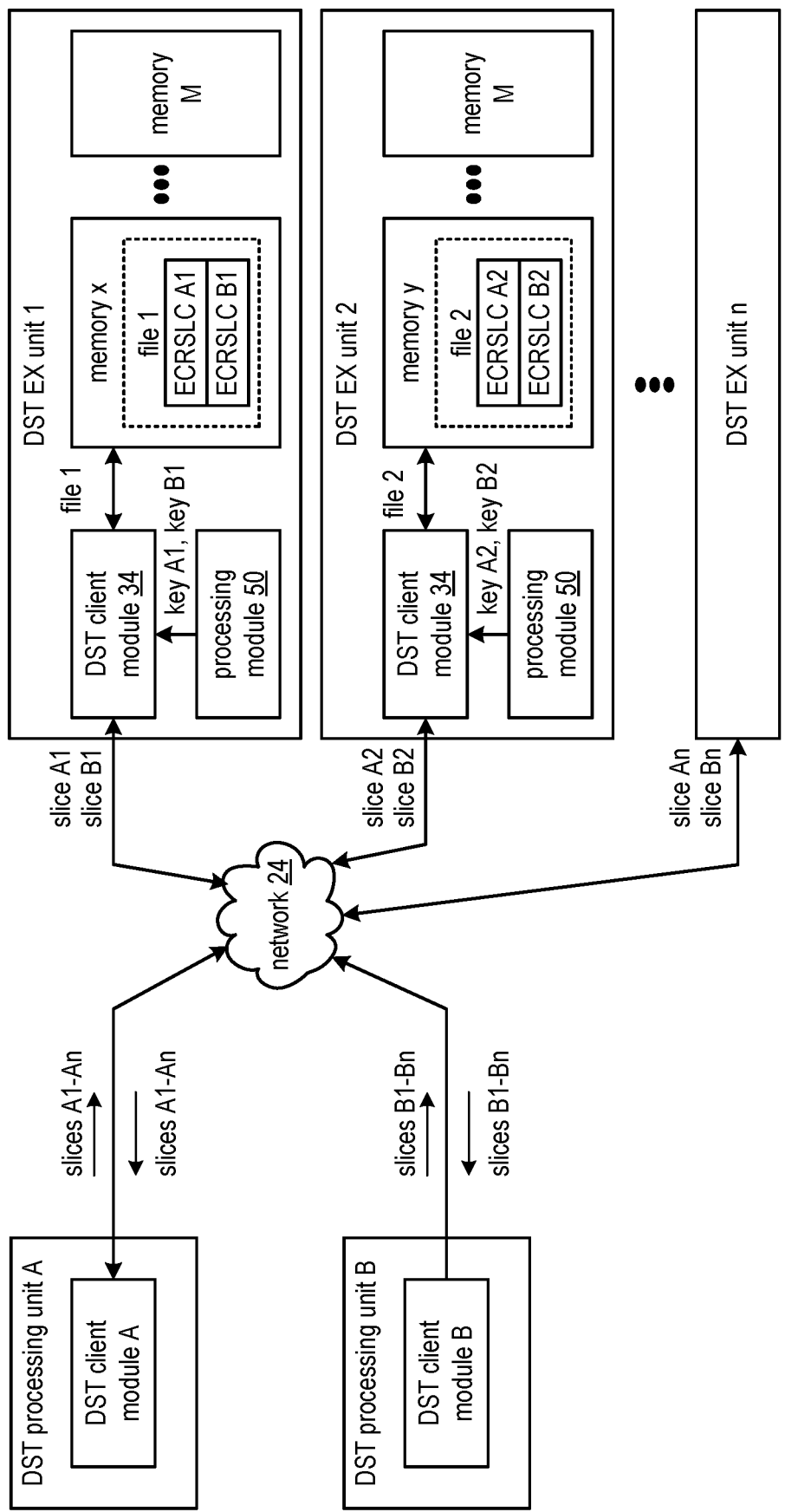
FIG. 3 is a schematic block diagrams of an embodiment of a dispersed storage network (DSN) in accordance with the present invention.

FIG. 3 is a schematic block diagram of another embodiment of a dispersed storage network (DSN) that includes a distributed storage and task (DST) processing unit A, a DST processing unit B, the network 24 of FIG. 1, and a set of DST execution (EX) units 1-n. The DST processing units A can include a DST client module A and the DST processing unit B includes a DST client module B. The DST processing units A-B can be implemented by utilizing the DST processing unit 16 of FIG. 1. The DST client modules A-B can be implemented utilizing the DST client module 34 of FIG. 1.

Each DST execution unit can include the DST client module 34 of FIG. 1, a plurality of memories (e.g., 1-M and including memory 35) and/or the processing module 50 of FIG. 2. Hereafter, the set of DST execution units can be interchangeably referred to as a set of storage units and the DST execution unit can be interchangeably referred to as a storage unit. Each DST execution unit can be implemented utilizing the DST execution unit 36 of FIG. 1. The DSN can function to securely store data.

In some cases, DST execution units can store slices from different vaults together in the same location. For example, within the same file, within the same directory structure, within the same database, etc. This proximity increases the likelihood of software errors or other faults that might result in the exposure of slices from one vault during the read of another vault's slices. For example, the corruption of the length field in the meta-data for slices stored together in the same file could result adjacent slices within that file being returned to the requester.

To prevent such errors from resulting in information exposure of other vault's data, a DST execution unit can employ the concept of per-vault, or per-slice keys, used to encrypt the content of proximate slices. If each DST execution unit maintains at least one randomly, pseudo-randomly, or otherwise secret key known only by that DST execution unit, e.g. each might be stored on each memory device within that DST execution unit, then the DST execution unit can use that secret key and use it with either a vault identifier, or even better: a vault identifier and a slice name to derive a per-slice key. For example, the DST execution unit can use a keyed-hash message authentication code (HMAC) to derive a key used to encrypt and decrypt that particular slice's content when stored on that particular memory device based on the memory device ID and the slice name (e.g. computing HMAC as a function of memory device key, slice name to derive the key)

During any write, the DST execution unit can encrypt the slice with that uniquely derived key before storing it (possibly with or next to other slices), and during any read, can decrypt it with that same key. Any rebalancing or transfer between DST execution units or between memory devices will result in the slice possibly being re-encrypted with a new key. In the event that errant content from other slices is read, it will be decrypted with the wrong key, and therefore will be of no value to the requester who receives it and it will not result in a data exposure. The requester never learns the secret keys known only by the DST execution unit, and hence cannot derive the per-slice-key necessary to decrypt any errantly received content of other slices.

In an embodiment, a processing system of a dispersed storage and task (DST) execution unit comprises at least one processor and a memory that stores operational instructions, that when executed by the at least one processor causes the processing system to receive a first encoded data slice for storage by the DST execution unit from a first vault. A first encryption key corresponding to the first encoded data slice is generated, and a first encrypted data slice is generated by utilizing the first encryption key. A second encoded data slice for second storage by the DST execution unit from a second vault, a second encryption key corresponding the second encoded data slice is generated, and a second encrypted data slice is generated by utilizing the second encryption key. The first encrypted data slice and the second encrypted data slice are stored in a file of a memory of the DST execution unit, where the file and the memory are common to the first encrypted data slice and the second encrypted data slice.

In various embodiments of the processing system, the first encryption key is generated by performing a deterministic function on a vault identifier associated with the first vault. The first encryption key can be generated by performing a deterministic function on both a vault identifier associated with the first vault and a memory identifier associated with the memory. In various embodiments, the first encryption key is generated by performing a deterministic function on a slice identifier associated with the first encoded data slice.

In various embodiments the processing system further executes operational instructions to receive a request to retrieve the first encoded data slice. The first encrypted data slice corresponding to the first encoded data slice is retrieved from the memory. The first encryption key corresponding to the first encoded data slice is regenerated. The first encoded data slice is regenerated by utilizing the first encryption key. In various embodiments, the first encryption key is regenerated by performing a deterministic function based on a slice identifier associated with the first encoded data slice. In various embodiments, the first encryption key is regenerated by performing a deterministic function based on a memory identifier associated with the memory.

In an example of operation of the secure storage of the data, a storage unit receives by the DST client module 34 of the storage unit, at least one encoded data slice per vault for at least two vaults for local storage. For example, DST execution unit 1 receives, via the network 24, an encoded data slice A1 of a vault A from the DST processing unit A and receives, via the network 24, an encoded data slice B1 of a vault B from the DST processing unit B. In particular, the DST client module A of the DST processing unit A encodes a data segment of the vault A to produce a set of encoded data slices A1-An and sends, via the network 24, the set of encoded data slices A1-An to the DST execution units 1-n for storage, and the DST client module B of the DST processing unit B encodes a data segment of the vault B to produce a set of encoded data slices B1-Bn and sends, via the network 24, the set of encoded data slices B1-Bn to the DST execution units 1-n for storage.

Having received the slices, for each received slice, the storage unit can determine, by the processing module 50, a corresponding encryption key. For example, the processing module can produce an encryption key A1 and an encryption key B1 for use on the slices A1 and B1. The determining can be based on one or more of a lookup based on a vault identifier, receiving the key, and/or generating the key by performing a deterministic function on a corresponding vault ID, a slice name, and/or a selective memory device identifier. The processing module 50 can generate a common encryption key for all slices of a vault by performing the deterministic function on the vault ID. The processing module can generate a common encryption key from slices stored in a common memory by performing the deterministic function on the vault ID and the memory ID. The processing module 50 can generate a unique encryption key for each encoded data slice by performing the deterministic function on the slice name and/or a slice identifier.

Having produced the corresponding encryption key, the DST client module 34 of the storage unit can encrypt each received encoded data slice by utilizing a corresponding encryption key to produce a corresponding encrypted slice. The encryption key can be used to perform a symmetric encryption algorithm, such as a keyed-hash message authentication code, a block cipher and/or a stream cipher, or another type of two-way encryption function that uses a key. For example, the DST client module 34 of the DST execution unit 1 can encrypt the slice A1 with the key A1 to produce an encrypted slice (ECRSLC) A1 and can encrypt the slice B1 with the key B1 to produce an encrypted slice (ECRSLC) B1.

Having encrypted the received slices, the storage unit can facilitate, by the DST client module 34, storage of at least two encrypted slices of the at least two vaults utilizing a common storage resource, where the common storage resources includes a common file and/or a common memory device. For example, the DST client module 34 of the DST execution unit 1 can pack the encrypted slices A1 and B1 into a file 1 and can store the file 1 in a selected memory 35 of the DST execution unit 1.

When retrieving a slice, the DST client module 34 of the storage unit can retrieve a encrypted slice corresponding to a desired slice from a corresponding memory. For example, the DST client module 34 of the DST execution unit 2 can retrieves a file 2 from a memory 35 of the DST execution unit 2 containing an encrypted slice A2. The processing module 50 of the storage unit can determine the corresponding encryption key. For example, the processing module 50 of the DST execution unit 2 reproduces the encryption key A2 corresponding to the encrypted slice A2 based performing a deterministic function on a slice name of the desired slice and a memory identifier of the memory 35. The DST client module 34 of the storage unit can decrypt the retrieved encrypted slice by utilizing the corresponding encryption key to reproduce the desired slice for transmission, via the network 24, to a requesting entity. For example, the DST client module 34 of the DST execution unit 2 decrypts the encrypted slice A2 utilizing the encryption key A2 to reproduce a slice A2 and sends, via the network 24, the slice A2 to the DST processing unit A.

In other embodiments, a slice can be encrypted with an encryption key, and decrypted with a separate decryption key. This can be achieved by encrypting the slice using an asymmetric function, such as RSA, Diffie-Hellman algorithm, Digital Signature Algorithm, El Gamal algorithm, ECDSA algorithm, and/or XTR algorithm. The encryption key and/or the decryption key can be public. For example, the slice can be encrypted based on a public key that can be universal, or based on a lookup based on a vault identifier, receiving the key, and/or generating the key by performing a deterministic function on a corresponding vault ID, a slice name, and/or a selective memory device identifier as discussed previously. The slice can be decrypted by determining the separate decryption key, which can be universal, or can also be determined based on a lookup based on a vault identifier, receiving the key, and/or generating the key by performing a deterministic function on a corresponding vault ID, a slice name, and/or a selective memory device identifier. The decryption with the separate decryption key can also be used to reproduce the desired slice for transmission.

Figure 4:
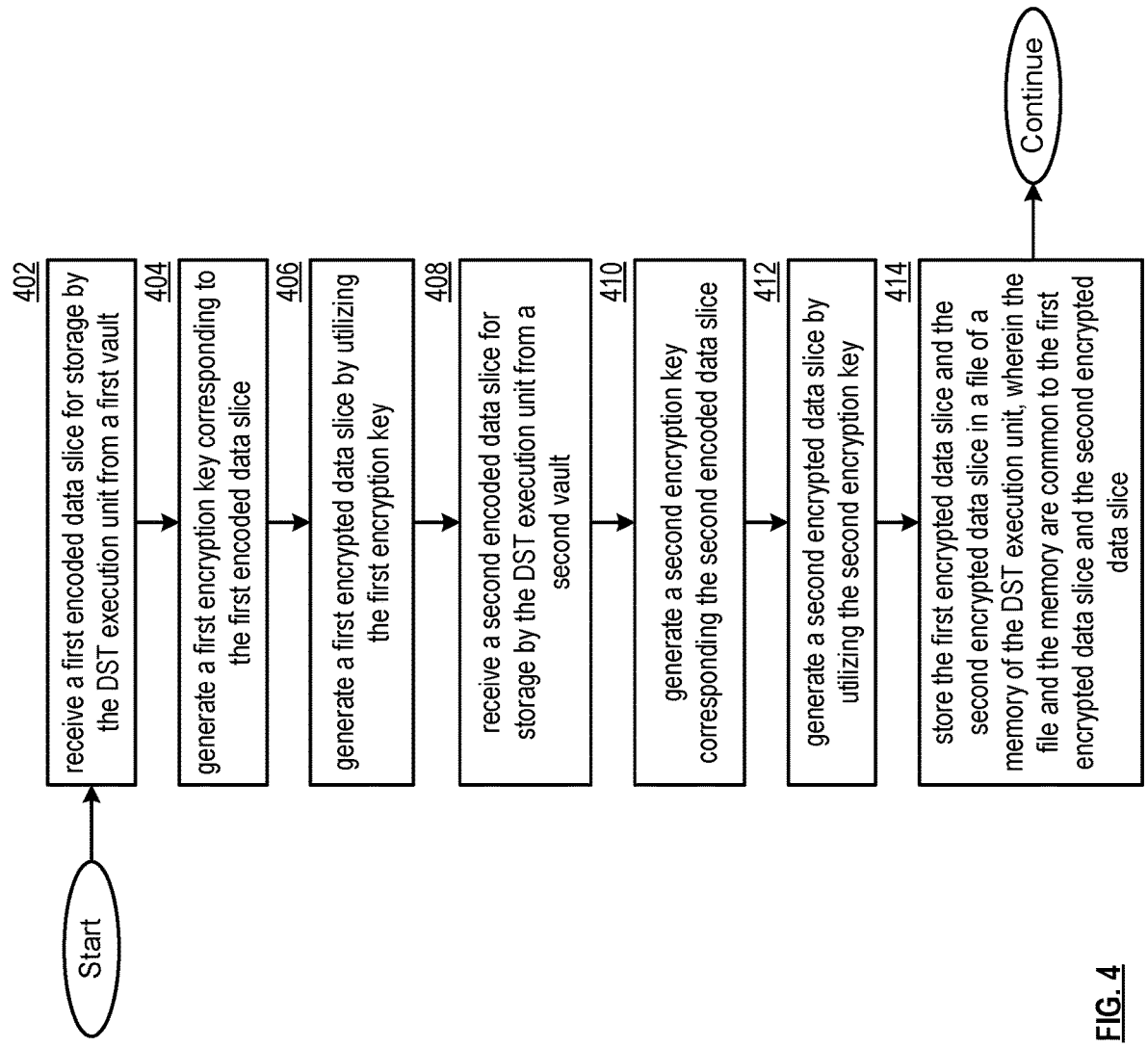
FIG. 4 is a flowchart illustrating an example of securely storing data in accordance with the present invention.

FIG. 4 is a flowchart illustrating an example of securely storing data. In particular, a method is presented for use in conjunction with one or more functions and features described in conjunction with FIGS. 1-4, for execution by a dispersed storage and task (DST) execution unit that includes a processor or via another processing system of a dispersed storage network that includes at least one processor and memory that stores instruction that configure the processor or processors to perform the steps described below. Step 402 includes receiving a first encoded data slice for storage by the DST execution unit from a first vault. Step 404 includes generating a first encryption key corresponding to the first encoded data slice. Step 406 includes generating a first encrypted data slice by utilizing the first encryption key. Step 408 includes receiving a second encoded data slice for storage by the DST execution unit from a second vault. Step 410 includes generating a second encryption key corresponding the second encoded data slice. Step 412 includes generating a second encrypted data slice by utilizing the second encryption key. Step 414 includes storing the first encrypted data slice and the second encrypted data slice in a file of a memory of the DST execution unit, wherein the file and the memory are common to the first encrypted data slice and the second encrypted data slice.

In various embodiments, the first encryption key is generated by performing a deterministic function on a vault identifier associated with the first vault. The first encryption key can be generated by performing a deterministic function on both a vault identifier associated with the first vault and a memory identifier associated with the memory. In various embodiments, the first encryption key is generated by performing a deterministic function on a slice identifier associated with the first encoded data slice.

In various embodiments, the method further comprises receiving a request to retrieve the first encoded data slice. The first encrypted data slice corresponding to the first encoded data slice is retrieved from the memory. The first encryption key corresponding to the first encoded data slice is regenerated. The first encoded data slice is regenerated by utilizing the first encryption key. In various embodiments, the first encryption key is regenerated by performing a deterministic function based on a slice identifier associated with the first encoded data slice. In various embodiments, the first encryption key is regenerated by performing a deterministic function based on a memory identifier associated with the memory.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by a processing system of a storage network that includes a processor, the method comprising:
    receiving a first encoded data slice for storage by the storage network, wherein the first encoded data slice is associated with a first vault;
    generating a first encryption key corresponding to the first encoded data slice based on a first vault identifier associated with the first vault;
    utilizing the first encryption key to generate a first encrypted data slice and that corresponds to, and is based on, the first encoded data slice;
    storing the first encrypted data slice in a first storage unit of the storage network;
    receiving a request to retrieve the first encoded data slice;
    retrieving the first encrypted data slice corresponding to the first encoded data slice from the first storage unit of the storage network;
    generating a first decryption key corresponding to the first encoded data slice based on the first vault identifier, wherein the first decryption key is different from the first encryption key; and
    regenerating the first encoded data slice using the first decryption key.

2. The method of claim 1, further comprising:
    receiving a second encoded data slice for storage by the storage network, wherein the second encoded data slice is associated with a second vault;
    generating a second encryption key corresponding the second encoded data slice based on on a second vault identifier associated with the second vault;
    generating a second encrypted data slice using the second encryption key; and
    storing the second encrypted data slice in a second storage unit of the storage network.

3. The method of claim 2, further comprising:
receiving a third encoded data slice for storage by the storage network, wherein the third encoded data slice is associated with the first vault;
generating a third encrypted data slice by utilizing the first encryption key; and
storing the third encrypted data slice in the first storage unit of the storage network.

4. The method of claim 2, wherein the first encryption key is generated by performing a deterministic function on the first vault identifier.

5. The method of claim 4, wherein the first encryption key is generated by performing the deterministic function further on a slice identifier of the first encoded data slice.

6. The method of claim 4, wherein the second encryption key is generated by performing the deterministic function on the second vault identifier.

7. The method of claim 1, further comprising:
re-encrypting the first encoded data slice with a new encryption key in response to a transfer of the first encoded data slice from the first storage unit to another storage unit.

8. A processing system of a storage network comprises:
an interface; and
processing circuitry, coupled to the interface, configured by operational instructions to perform operations that include:
receiving a first encoded data slice for storage by the storage network, wherein the first encoded data slice is associated with a first vault;
generating a first encryption key corresponding to the first encoded data slice based on a first vault identifier associated with the first vault;
utilizing the first encryption key to generate a first encrypted data slice and that corresponds to, and is based on, the first encoded data slice;
storing the first encrypted data slice in a first storage unit of the storage network;
receiving a request to retrieve the first encoded data slice;
retrieving the first encrypted data slice corresponding to the first encoded data slice from the first storage unit of the storage network;
generating a first decryption key corresponding to the first encoded data slice based on the first vault identifier, wherein the first decryption key is different from the first encryption key; and
regenerating the first encoded data slice using the first decryption key.

9. The processing system of claim 8, wherein the operations further include:
receiving a second encoded data slice for storage by the storage network, wherein the second encoded data slice is associated with a second vault;
generating a second encryption key corresponding the second encoded data slice based on on a second vault identifier associated with the second vault;
generating a second encrypted data slice using the second encryption key; and
storing the second encrypted data slice in a second storage unit of the storage network.

10. The processing system of claim 9, wherein the operations further include:
receiving a third encoded data slice for storage by the storage network, wherein the third encoded data slice is associated with the first vault;
generating a third encrypted data slice by utilizing the first encryption key; and
storing the third encrypted data slice in the first storage unit of the storage network.

11. The processing system of claim 9, wherein the first encryption key is generated by performing a deterministic function in the first vault identifier.

12. The processing system of claim 11, wherein the first encryption key is generated by performing the deterministic function further on a slice identifier of the first encoded data slice.

13. The processing system of claim 11, wherein the second encryption key is generated by performing the deterministic function on the second vault identifier.

14. The processing system of claim 8, wherein the operations further include:
re-encrypting the first encoded data slice with a new encryption key in response to a transfer of the first encoded data slice from the first storage unit to another storage unit.

15. A non-transitory computer readable storage medium comprises:
at least one memory that stores operational instructions that, when executed by a processing system of a storage network having a processor, causes the processing system to perform operations including:
receiving a first encoded data slice for storage by the storage network, wherein the first encoded data slice is associated with a first vault;
generating a first encryption key corresponding to the first encoded data slice based on a first vault identifier associated with the first vault;
utilizing the first encryption key to generate a first encrypted data slice and that corresponds to and is based on the first encoded data slice;
storing the first encrypted data slice in a first storage unit of the storage network;
receiving a request to retrieve the first encoded data slice;
retrieving the first encrypted data slice corresponding to the first encoded data slice from the first storage unit of the storage network;
generating a first decryption key corresponding to the first encoded data slice based on the first vault identifier, wherein the first decryption key is different from the first encryption key; and
regenerating the first encoded data slice using the first decryption key.

16. The non-transitory computer readable storage medium of claim 15, wherein the operations further include:
receiving a second encoded data slice for storage by the storage network, wherein the second encoded data slice is associated with a second vault;
generating a second encryption key corresponding the second encoded data slice based on on a second vault identifier associated with the second vault;
generating a second encrypted data slice using the second encryption key; and
storing the second encrypted data slice in a second storage unit of the storage network.

17. The non-transitory computer readable storage medium of claim 16, wherein the operations further include:
receiving a third encoded data slice for storage by the storage network, wherein the third encoded data slice is associated with the first vault;
generating a third encrypted data slice by utilizing the first encryption key; and
storing the third encrypted data slice in the first storage unit of the storage network.

18. The non-transitory computer readable storage medium of claim 16, wherein the first encryption key is generated by performing a deterministic function on the first vault identifier.

19. The non-transitory computer readable storage medium of claim 18, wherein the first encryption key is generated by performing the deterministic function further on a slice identifier of the first encoded data slice.

20. The non-transitory computer readable storage medium of claim 18, wherein the second encryption key is generated by performing the deterministic function on the second vault identifier.

* * * * *